United States Patent
Gieras

(10) Patent No.: US 10,622,929 B2
(45) Date of Patent: Apr. 14, 2020

(54) RELUCTANCE-TYPE ROTARY ACTUATORS

(71) Applicant: Hamilton Sundstrand Corporation, Charlotte, NC (US)

(72) Inventor: Jacek F. Gieras, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 22 days.

(21) Appl. No.: 15/411,691

(22) Filed: Jan. 20, 2017

(65) Prior Publication Data

US 2018/0212544 A1 Jul. 26, 2018

(51) Int. Cl.

| | |
|---|---|
| *H02P 25/08* | (2016.01) |
| *B64C 13/50* | (2006.01) |
| *H02K 1/24* | (2006.01) |
| *H02K 1/14* | (2006.01) |
| *H02K 11/33* | (2016.01) |
| *H02K 3/28* | (2006.01) |
| *H02K 7/118* | (2006.01) |
| *B64C 9/16* | (2006.01) |
| *H02K 33/02* | (2006.01) |
| *H02K 26/00* | (2006.01) |
| *H02K 19/06* | (2006.01) |

(52) U.S. Cl.
CPC .............. *H02P 25/08* (2013.01); *B64C 13/50* (2013.01); *H02K 1/14* (2013.01); *H02K 1/141* (2013.01); *H02K 1/143* (2013.01); *H02K 1/246* (2013.01); *H02K 3/28* (2013.01); *H02K 7/1185* (2013.01); *H02K 11/33* (2016.01); *B64C 9/16* (2013.01); *H02K 19/06* (2013.01); *H02K 26/00* (2013.01); *H02K 33/02* (2013.01); *Y02T 50/44* (2013.01)

(58) Field of Classification Search
CPC ...... H02K 1/2766; H02K 1/246; H02K 1/276; H02K 21/14; H02K 2213/03
See application file for complete search history.

(56) References Cited

U.S. PATENT DOCUMENTS

| | | | |
|---|---|---|---|
| 1,634,575 A | 7/1927 | Hawkins | |
| 2,584,365 A * | 2/1952 | Palffy | ..... H02K 1/146 310/216.102 |
| 3,434,082 A | 3/1969 | Montagu | |
| 4,164,722 A | 8/1979 | Garvey | |

(Continued)

FOREIGN PATENT DOCUMENTS

| | | |
|---|---|---|
| CN | 202424445 | 9/2012 |
| DE | 750912 | 1/1945 |

(Continued)

OTHER PUBLICATIONS

Translation of FR1169095 has been attached.*

(Continued)

*Primary Examiner* — Shawki S Ismail
*Assistant Examiner* — Zoheb S Imtiaz
(74) *Attorney, Agent, or Firm* — Locke Lord LLP; Scott D. Wofsy; Georgi Korobanov

(57) ABSTRACT

An actuator includes a yoke extending about a rotation axis. A coil is wrapped about the yoke. A rotor having a direct axis and a quadrature axis is supported for rotation about a rotation axis relative to the yoke. The rotor has a reluctance along the direct axis that is different than a reluctance along the quadrature axis to rotate the rotor when current is applied to the coil.

18 Claims, 10 Drawing Sheets

(56) References Cited

U.S. PATENT DOCUMENTS

| | | | | |
|---|---|---|---|---|
| 4,339,873 A | * | 7/1982 | Kanamaru | H02K 1/24 |
| | | | | 29/520 |
| 4,346,319 A | * | 8/1982 | Naganuma | H02K 33/02 |
| | | | | 310/36 |
| 4,489,262 A | | 12/1984 | Moren et al. | |
| 5,596,442 A | | 1/1997 | Plesko | |
| 6,313,553 B1 | | 11/2001 | Gandel et al. | |
| 6,472,967 B1 | | 10/2002 | Muraji | |

FOREIGN PATENT DOCUMENTS

| | | | |
|---|---|---|---|
| DE | 2830062 | | 1/1980 |
| DE | 4102263 | | 8/1992 |
| DE | 202006014493 | | 2/2007 |
| FR | 878502 | | 1/1943 |
| FR | 1119971 | | 6/1956 |
| FR | 1169095 | * | 12/1958 |
| GB | 1262855 A | | 2/1972 |
| JP | S52169712 | | 12/1977 |
| JP | H05316701 | | 11/1993 |

OTHER PUBLICATIONS

Extended European Search Report for European Patent Application No. 18152035.4, dated Mar. 22, 2018.
Office Action dated Mar. 14, 2019 in corresponding European Application No. 18152035.4.

* cited by examiner

US 10,622,929 B2

RELUCTANCE-TYPE ROTARY ACTUATORS

BACKGROUND OF THE INVENTION

1. Field of the Invention

The present disclosure relates to rotary actuators, and more particularly to reluctance-type rotary actuators.

2. Description of Related Art

Vehicles, such as aircraft, commonly include rotary actuators for operating various devices. Rotary actuators generally produce a rotary motion or torque, which is applied to a mechanical device to change the position of a movable element using the rotary motion or torque and allowing control of the device. Examples of device operated by rotary actuators include servo-control valves (such as in fuel, oil, hydraulic and pneumatic systems), flight control surfaces, and electromagnetic throttles.

Rotary actuators typically include a plurality of magnets, a plurality of magnetic pole pieces, coils, an armature, and a lever. The coils are controllably energized to generate a magnetic force that is transmitted through the pole pieces and across air gaps into which portions of the armature extend. The magnetic force acts on and controls the rotational position of the armature through a magnetic circuit routed through windings or magnets of the armature. By controlling the rotational position of the armature, the position of a lever, a valve element, or other device, is controlled. Control of armature rotational position is typically through control of magnetic flux in the magnetic circuit, usually through solid-state switch devices electrically connected between the coil and a power source, typically by connector pins.

Such conventional methods and systems have generally been considered satisfactory for their intended purpose. However, there is still a need in the art for improved rotary reluctance-type actuators. The present disclosure provides a solution for this need.

SUMMARY OF THE INVENTION

An actuator includes a yoke with a first pole piece and a second pole piece. A coil is wrapped about the yoke between the first and second pole pieces. A rotor having a direct axis and a quadrature axis is supported for rotation about a rotation axis between the first and second pole pieces. The rotor has a different reluctance along the direct axis than along the quadrature axis to rotate the rotor when current is applied to the coil.

In certain embodiments, switched direct current (DC) power supply can be connected to the coil. A switched alternating current (AC) power supply can be connected to the coil. The coil can be a first coil and the actuator can include a second coil. The second coil can be fixed to the yoke on a side of the rotation axis opposite the first coil. The second coil can be connected to the first coil in series. The second coil can be connected to the first coil in parallel.

In accordance with certain embodiments, the actuator can include a biasing member. The biasing member can be arranged to urge a portion of the rotor having high reluctance into a magnetic circuit defined between the first and second pole pieces. The biasing member can be arranged to urge the rotor quadrature axis into alignment with the coil. The biasing member can be arranged to urge the rotor direct axis into alignment with the coil. The biasing member can be a spring.

It is contemplated that, in accordance with certain embodiments, no permanent magnet can be carried by the rotor. It is also contemplated that no winding can be carried by the rotor. The rotor can have a uniform profile. The rotor can have narrow pole faces. The rotor can have symmetrically stepped pole faces. The rotor can have asymmetrically stepped pole faces. The rotor can have voids or inclusions within its interior. The voids or inclusions can be arranged along the rotor direct axis or quadrature axis. The voids or inclusions can be chevron-shaped.

A flight control arrangement includes a flight control device having first and second positions. An actuator as described above is operably connected to the flight control device. The rotor can be operably connected to the flight control device such that movement of the rotor quadrature or direct axis into alignment with the pole pieces mores the flight control device between the first position and the second position.

A method of actuating a device includes applying current to coil and generating a magnetic flux between first and second pole pieces of a yoke. Responsive to generation of the magnetic field a rotor supported for rotation relative to the poles rotates according to different reluctances of the rotor such that a direct axis of the rotor is aligned between the first and second pole pieces. In certain embodiments the rotor rotates in an opposite direction upon removal of the current from the coil.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
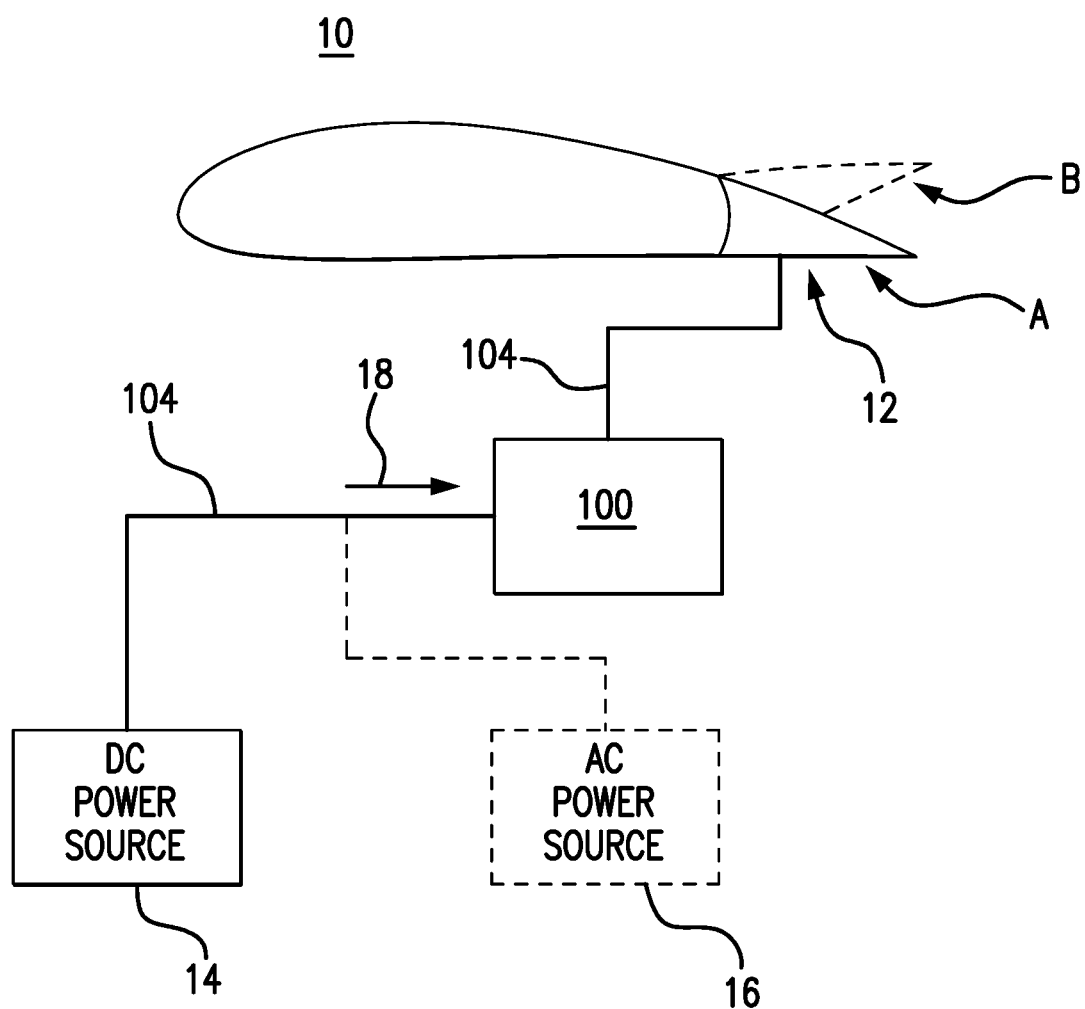
FIG. 1 is a schematic view of an exemplary embodiment of a reluctance-type actuator constructed in accordance with the present disclosure, showing the actuator operably connected to a flight control device.

Reference will now be made to the drawings wherein like reference numerals identify similar structural features or aspects of the subject disclosure. For purposes of explanation and illustration, and not limitation, a partial view of an exemplary embodiment of an electromagnetic actuator in accordance with the disclosure is shown in FIG. 1 and is designated generally by reference character 100. Other embodiments of electromagnetic actuators and methods of actuating devices using such actuators in accordance with the disclosure, or aspects thereof, are provided in FIGS. 2-7, as will be described. The systems and methods described herein can be used for actuating devices like throttles, fluid flow control devices and flight control devices, such as in aircraft, though the present disclosure is not limited to such devices or to aircraft in general.

Referring to FIG. 1, an aircraft 10 is shown. Aircraft 10 includes a wing with a flight control device 12 movable between a first position A and a second position B. An actuator 100 is operably connected to flight control device 12 and arranged to move flight control device 12 between first position A and second position B. A switched power supply, e.g., a direct current (DC) power supply 14 (shown in solid outline) or an alternating current (AC) power supply 16 (shown in dashed outline), is connected to actuator 100 to cause actuator 100 to move flight control device 12 between first position A and second position B upon application of electrical current to actuator 100. Current provided to actuator 100, e.g., an actuation current 18, can be continuous or pulsed.

Figure 2:
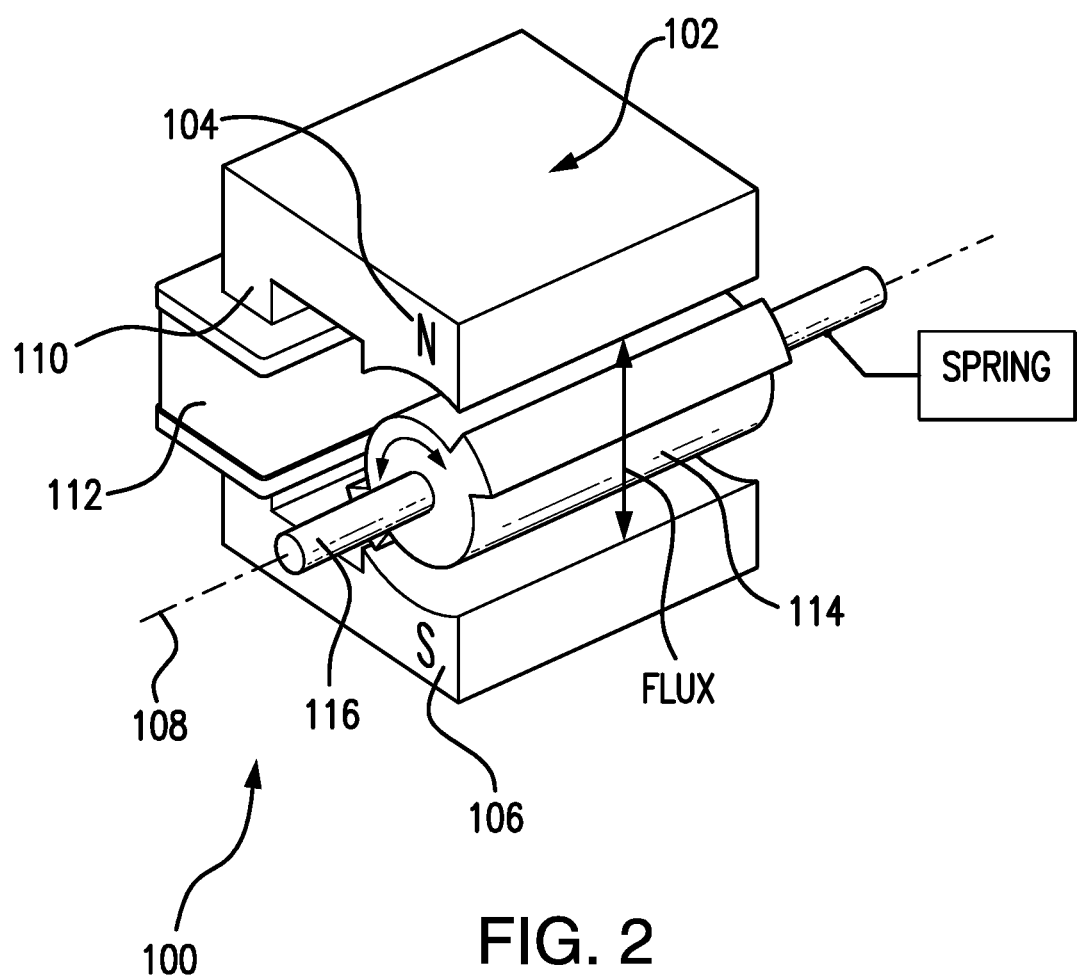
FIG. 2 is a perspective view of the actuator of FIG. 1 according to an exemplary embodiment, showing a single coil.

With reference to FIG. 2, actuator 100 is shown. Actuator 100 includes a yoke 102 having a first pole piece 104, a second pole piece 106, and a limb 110. Second pole piece 106 and first pole piece 104 are arranged on opposite sides of a rotation axis 108 and are connected to one another by limb 110. Coil 112 wraps about limb 110 and is arranged circumferentially between first pole piece 104 and second pole piece 106. Yoke 102 can be constructed, for example, from a plurality of laminations. The laminations can be sheet-like structures having planar surfaces and axially stacked such that planar surfaces are perpendicular relative to rotation axis 108. The laminations can be stamped from steel sheet or include a soft magnetic composite material formed from a sintered powder. In the illustrated exemplary embodiment shown in FIG. 2, yoke 102 has a U-shaped profile.

A rotor 114 is mounted to a shaft 116 and supported for rotation about rotation axis 108. Shaft 116 can be formed from steel. Rotor 114 includes a plurality of steel laminations axially stacked with one another along rotation axis 108. The steel laminations are generally oblong in shape and shaped to define longitudinally opposed pole faces. The opposed pole faces are generally arcuate in shape and present curved faces towards yoke 102.

In use, when an electric current is passed through the coil 112, magnetic flux generated between first pole piece 104 and second pole piece 106 will tend to move rotor 114 angularly about rotation axis 108 in a direction to reduce the reluctance of the overall magnetic circuit of actuator 100. With rotor 114 in the angular position shown in FIG. 2, the angular movement will be in a counterclockwise direction according the different reluctances of rotor 114. In this respect the angular movement with from an unaligned position (shown in FIG. 4), wherein a direct axis 128 (shown in FIG. 3A) of rotor 114 overlays an axis extending through coil 112, toward an aligned position (shown in FIG. 4), wherein direct axis 128 overlays an axis extending between first pole piece 104 and second pole piece 106. It is contemplated movement from the aligned position to the unaligned position can be in a direction rotationally opposite that of movement from the unaligned position to the aligned position.

With continuing reference to FIG. 2, actuator 100 can include a biasing member (illustrated schematically). The biasing member can be arranged to urge a portion of the rotor having high reluctance, e.g., portion B (shown in FIG. 3A), into a magnetic circuit defined between first pole piece 104 and second pole piece 106. For example, a first end of the biasing member can be connected to yoke 102 and an opposed second end of the biasing member can be connected to rotor 114. In this respect the biasing member can be arranged to bias rotor 114 toward the unaligned position to return rotor 114 to the unaligned position when current is removed from coil 112. It is contemplated that biasing member can include resilient member, such as a spring by way of non-limiting example.

Figure 3A:
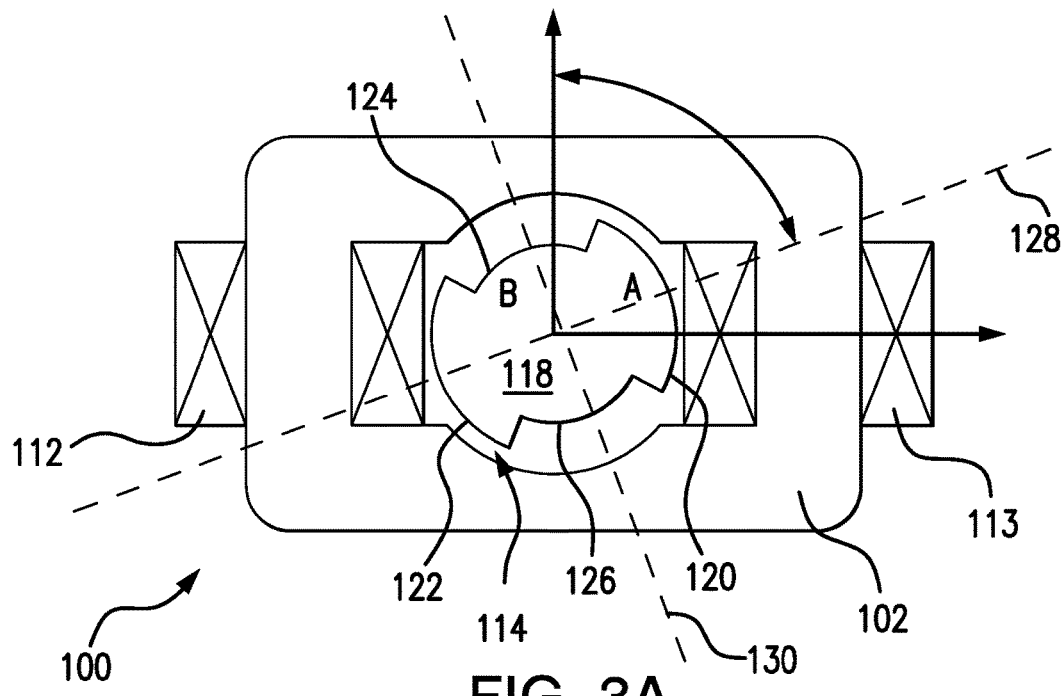
FIGS. 3A-3C are schematic views of another embodiment of an actuator in accordance with the present disclosure, showing a core having two coils connected in series and in parallel with one another.

With reference to FIG. 3A, rotor 114 is shown in an embodiment in an axial end view. Rotor 114 has an axial profile 118 bounded by a first pole face 120, a longitudinally opposed second pole face 122, a first lateral face 124, and a second lateral face 126. Profile 118 is oblong and defines a direct axis 128 and a quadrature axis 130. Direct axis 128 extends longitudinally across profile 118, direct axis 128 intersecting rotation axis 108 and longitudinally spanning first pole face 120 and second pole face 122 of profile 118. Quadrature axis 130 extends laterally across profile 118 at a 90 degree angle relative to direct axis 128, quadrature axis intersecting rotation axis 108 and laterally spanning first lateral face 124 and second lateral face 126. In the illustrated exemplary embodiment quadrature axis 130 intersects direct axis 128 at a 90-degree angle.

Rotor 114 has a different reluctance along direct axis 128 than along quadrature axis 130, as indicated in FIG. 3 schematically with reluctance region A and reluctance region B. The different reluctance can imparted into rotor of actuator 100 through variation of composition of the actuator rotor, as shown in the exemplary rotors 614 and 714 appearing in FIGS. 6A and 6B. The different reluctance can be imparted by the shape of the profile selected for the rotor of actuator 100, as shown in the exemplary rotors 214-514 appearing in FIGS. 5A-5D. The different reluctance can be imparted by the air gap swept by the rotor direct axis in comparison to the width of an airgap swept by the rotor quadrature axis over an angular movement range of the rotor, as shown in FIG. 4. As will be appreciated by those of skill in the art, the rotor arrangement selected for actuator 100 in a given embodiment can have the different reluctance along direct axis 128 and quadrature axis 130 the consequence of one or more of rotor composition, rotor geometry, and/or air gap width differences.

Figure 3B:
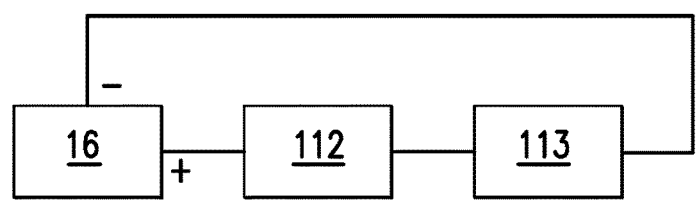
Figure 3C:
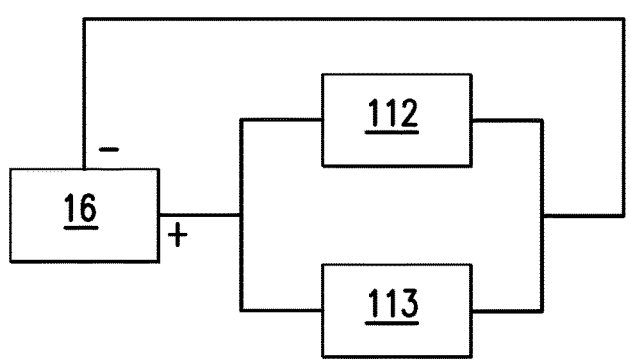
Figure 4:
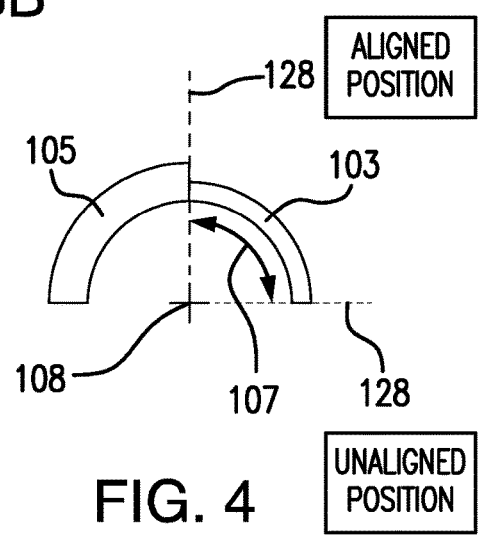
FIG. 4 is a schematic view of the air gap defined between the rotor and core of the actuators of FIGS. 2 and 3A, showing a relatively narrow air gap swept by the rotor direct axis and a relatively wide air gap swept by the rotor quadrature axis within the rotor movement axis.

Referring to FIGS. 3A-3C, actuator 100 can have more than one coil. In this respective actuator 100 can have a first coil 112 and a second coil 113. Second coil 113 can be disposed on a side of rotation axis 108 opposite first coil 112 and separated therefrom by 180 degrees. Second coil 113 can be connected electrically in series with first coil 112, as shown in FIG. 3B. Second coil 113 can be connected electrically in parallel with first coil 112, as shown in FIG. 3C.

Referring to FIG. 4, air gap widths are shown for an exemplary movement range. In the illustrated exemplary embodiment rotor 114 (shown in FIG. 3A) has a movement range 107. Movement range 107 is about 90 degrees. A first air gap width 103 swept by direct axis 128 (shown in FIG. 3A) as rotor 114 moves through movement range 107 is defined between first pole face 120 (shown in FIG. 3A) and yoke 102 (shown in FIG. 3A). A second air gap width 105 swept by quadrature axis 130 (shown in FIG. 3A) as rotor 114 moves through movement range 107 is defined between first lateral face 124 (shown in FIG. 3A) and yoke 102. First air gap width 103 is smaller than second air gap width 105, imparting different reluctances within rotor 114 along direct axis 128 and quadrature axis 130, and thereby influencing the force/torque density for actuator 100 for a given magnetic flux density within the air gap defined between rotor 114 and yoke 102. Although illustrated as having a movement range of 90 degrees, it is to be understood and appreciated that movement range 107 can sized as appropriate for an intended application. For example, in certain embodiments movement range 107 is between 60 degrees and 90 degrees.

Figure 5A:
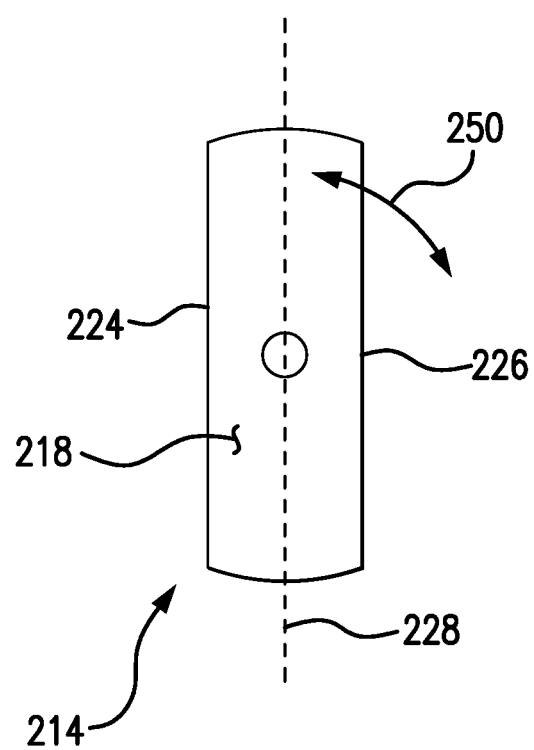
FIGS. 5A-5D are axial end views of embodiments of rotors of the actuator shown in FIG. 1, showing rotors with oblong profiles.

Referring to FIGS. 5A-5D, embodiments of rotors with pole faces having different profiles are shown. With reference to FIG. 5A, a rotor 214 is shown. Rotor 214 is similar to rotor 114 and additionally has a uniform profile 218. Uniform profile 218 has a first lateral face 224 and a second lateral face 226 which extend in parallel with one another and with direct axis 228 along the longitudinal width of rotor 214. This causes rotor 214 to provide relatively low amounts of actuation force for a given amount of magnetic flux in comparison to rotor 114. It can also be used to reduce the actuation movement range 250 of rotor 214, movement range 250 being less than 90 degrees and greater than 60 degrees in contemplated embodiments.

Figure 5B:
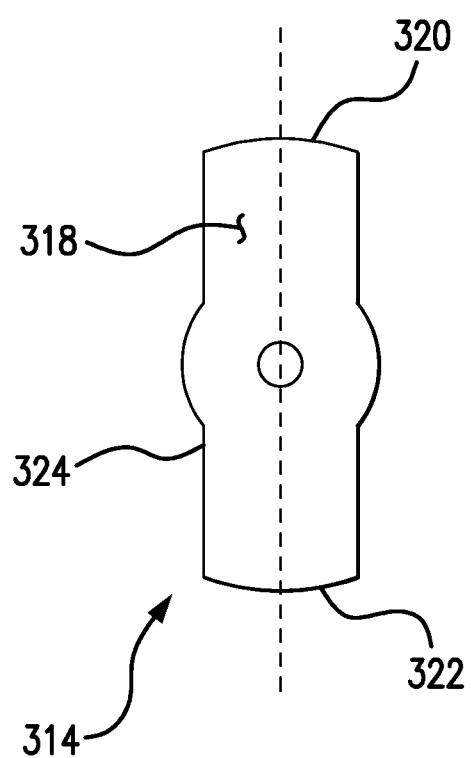

With reference to FIG. 5B, a rotor 314 is shown. Rotor 314 is similar to rotor 114 and additionally has profile 318 with a first pole face 320 and a second pole face 322. First pole face 320 and second pole face 322 are each narrow pole faces. Profile 318 provides lower reluctance between yoke 102 (shown in FIG. 2) and rotor 314. The reduced reluctance enables rotor 314 to provide more actuation force for a given magnetic flux than rotor 114.

Figure 5C:
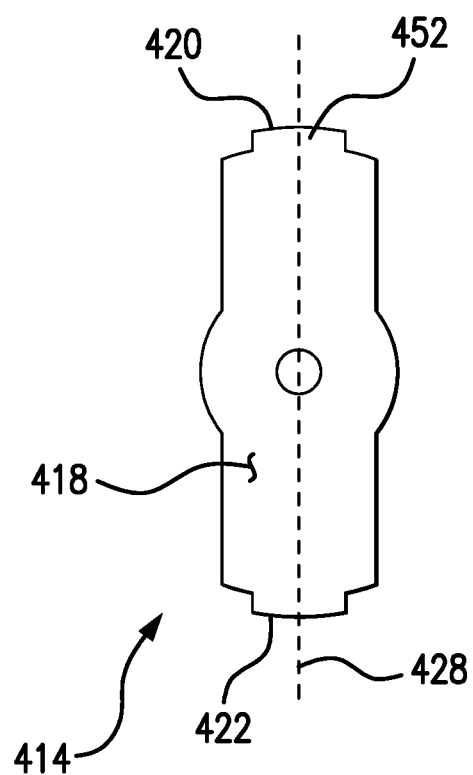

With reference to FIG. 5C, a rotor 414 is shown. Rotor 414 is similar to rotor 114 and additionally has profile 418 with a first pole face 420 and a second pole face 422. First pole face 420 and second pole face 422 each include a step 452. Step 452 is symmetrically arranged on respective pole face, i.e. is bisected by direct axis 428, and extends longitudinally from opposite ends of rotor 414. Step 452 strengths the electromagnetic holding force of actuator 100 when positioned aligned between first pole piece 104 (shown in FIG. 2) and second pole piece 106 (shown in FIG. 2), i.e. is arranged vertically relatively to the orientation of yoke 102 as shown in FIG. 2. As a consequence to the symmetrically stepped arrangement shown in FIG. 4C, actuators employing rotor 414 can maintain an actuated device more firmly in the actuated position for a given amount of magnetic flux in the air gap between the rotor and yoke.

Figure 5D:
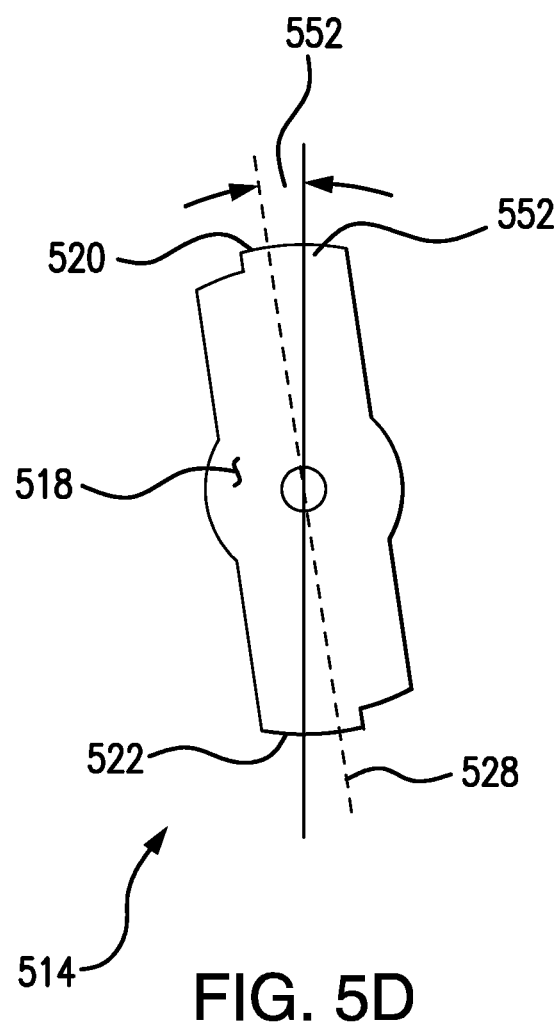

With reference to FIG. 5D, a rotor 514 is shown. Rotor 514 is similar to rotor 414 and additionally has profile 518 with a pole faces having an asymmetrically positioned step 552. In this respect first pole face 520 and second pole face 522 each include a step 552 that is offset relative to the geometric axis (shown with a dashed line), thereby biasing direct axis 528 relative to the geometric axis of rotor 514 by the indicated angle. Step 552 causes rotor 514 to align asymmetrically relative to magnetic flux within the air gap between yoke 102 (shown in FIG. 2) and rotor 514, as indicated by alignment offset angle 554 defined between the poles of yoke 102 and direct axis 528 of rotor 514.

Figure 6A:
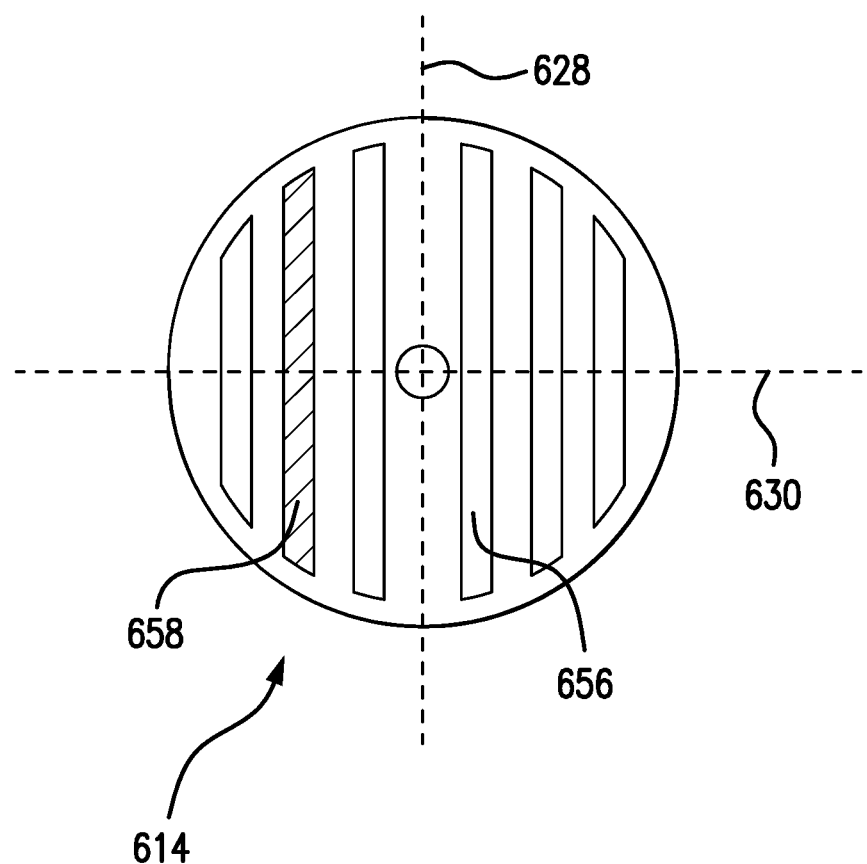
FIGS. 6A and 6B are axial end views of embodiments of rotors of the actuator shown in FIG. 1, showing rotors with circular profiles.

With reference to FIG. 6A, a rotor 614 is shown. Rotor 614 includes one or more voids 656 or inclusions 658 within the interior of rotor 614. The one or more voids 656 or inclusions 658 are arranged along quadrature axis 630 in a symmetrical distribution and have reluctances that differ from the material forming the remainder of rotor 614. For example, inclusions 658 can contain a non-ferromagnetic material like aluminum or aluminum alloy. The variation in composition of rotor 614 creates a different reluctance along direct axis 628 in relation to the reluctance along quadrature axis 630. It is contemplated that the different reluctances can be defined with reduced (or independent of) the gap width defined between rotor 614 and yoke 102 (shown in FIG. 2).

Figure 6B:
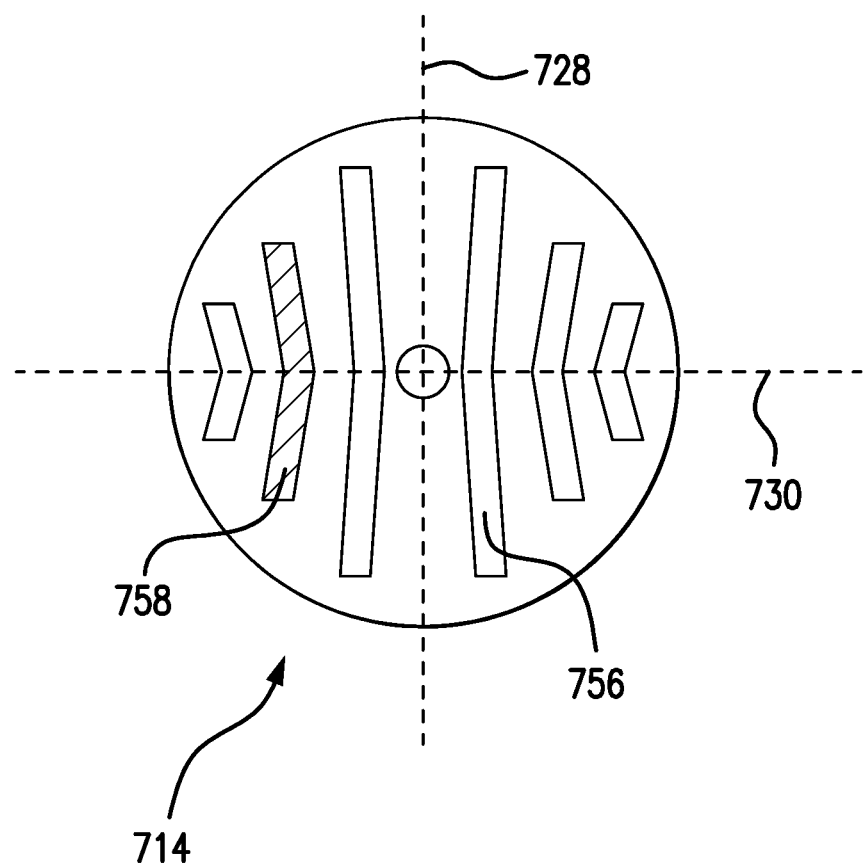

With reference to FIG. 6B, a rotor 714 is shown. Rotor 714 is similar to rotor 614 and additionally includes one or more voids 756 or inclusions 758 within the interior of rotor 714. The one or more voids 756 or inclusions 758 are arranged along quadrature axis 730 in a symmetrical distribution and have reluctances that differ from the material forming the remainder of rotor 714. In the illustrated exemplary embodiment the one or more voids 756 or inclusions 758 are chevron-shaped. As with rotor 414 (shown in FIG. 4C), the chevron-shape increases the holding force provided by rotor 714 for a given amount of magnetic flux within the air gap defined between rotor 714 and yoke 102 (shown in FIG. 2).

Figure 7:
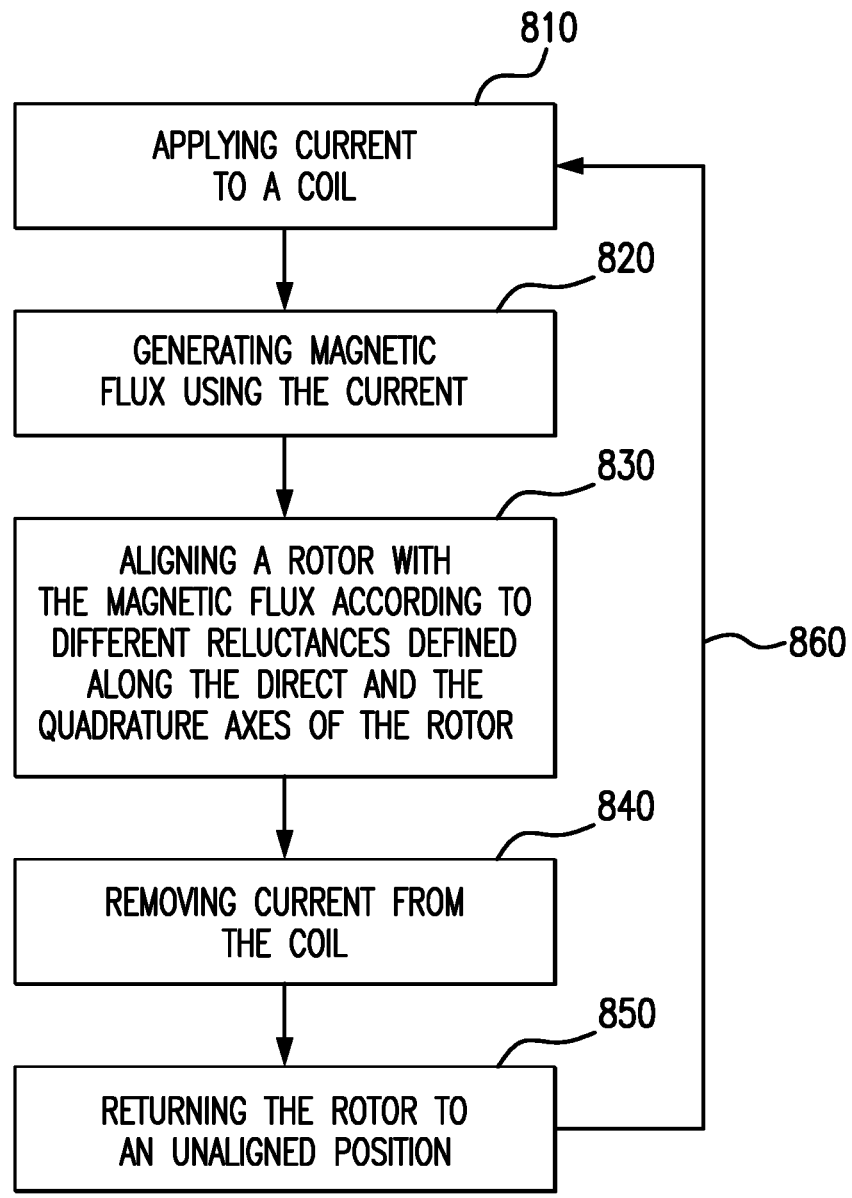
FIG. 7 is a diagram of a method of actuating an actuated device, showing steps of the method.

With reference to FIG. 7, a method 800 of actuating an actuated device using a single-phase reluctance-type electromagnetic actuator, e.g., actuator 100 (shown in FIG. 1), is shown. Method 800 includes applying electrical current to a coil, e.g., coil 112 (shown in FIG. 2), as shown with box 810. Current flowing through the coil generates magnetic flux, e.g., magnetic flux F (shown in FIG. 2), between opposite poles of a yoke, e.g., yoke 102 (shown in FIG. 2), as shown with box 820. The magnetic flux causes a rotor, e.g., rotor 114 (shown in FIG. 2), to align with the magnetic flux according to different reluctance of the rotor along direct and quadrature axes of the rotor, as show in box 830. The rotor thereafter returns to an unaligned position, such as by retracing in reverse motion a rotary movement traversed while moving to the aligned position, as such shown by box 850, subsequent to removing current from the coil, as shown by box 840. The actuated device can be cycled between first and second positions, as shown in FIG. 6 by arrow 860.

The methods and systems of the present disclosure, as described above and shown in the drawings, provide for electromagnetic actuators with superior properties including reduced weight and size. For example, in certain embodiments actuators are provided having high force and torque density in comparison to conventional stepper motors. In accordance with certain embodiments, actuators described can have limited power loss, power loss in the actuator being substantially equivalent to the Joules losses dissipated in the yoke coils. As will be appreciated, the temperature rise in the yoke coil from power loss can also be relatively low. It is also contemplated that, in accordance with certain embodiments, the number of electrical connectors and solid-state switch devices can be small owing to the limited number of coils necessary for the actuators described herein. While the apparatus and methods of the subject disclosure have been shown and described with reference to preferred embodiments, those skilled in the art will readily appreciate that change and/or modifications may be made thereto without departing from the scope of the subject disclosure.

What is claimed is:

1. An actuator, comprising:
a yoke extending about a rotation axis;
a coil wrapped about the yoke; and
a rotor having a direct axis and a quadrature axis supported for rotation about the rotation axis, wherein a reluctance along the rotor direct axis is different than a reluctance along the quadrature axis, the actuator configured to rotate the rotor when current is applied to the coil, wherein the rotor includes at least one internal void and at least one internal inclusion, including a non-ferromagnetic material, that makes reluctance along one of the direct and quadrature axes different than that along the other of the direct and quadrature axes.

2. The actuator as recited in claim 1, wherein an air gap between the rotor and yoke swept by the direct axis within a range of motion of the rotor is smaller than an air gap between the rotor and yoke swept by the quadrature axis within a range of motion of the rotor.

3. The actuator as recited in claim 1, wherein the reluctance along the quadrature axis is greater than the reluctance along the direct axis.

4. The actuator as recited in claim 1, wherein the second coil is connected in series with the first coil.

5. The actuator as recited in claim 1, wherein the second coil is connected in parallel with the first coil.

6. The actuator as recited in claim 1, further comprising a switched direct current (DC) power supply connected to the coil.

7. The actuator as recited in claim 1, further comprising a switched alternating current (AC) power supply connected to the coil.

8. The actuator as recited in claim 1, further comprising a biasing member connected between the rotor and the yoke, wherein the biasing member is arranged to urge a high reluctance portion of the rotor into a magnetic circuit defined between opposed poles of the yoke.

9. The actuator as recited in claim 8, wherein the biasing member is arranged to rotate the rotor between an aligned position and an unaligned position when an actuation current is removed from the coil.

10. The actuator as recited in claim 1, wherein the rotor does not include a winding, wherein the rotor does not include a permanent magnet.

11. The actuator as recited in claim 1, wherein rotor has a rotor profile spanned by the direct axis with profile segments that are (a) uniform, (b) narrow, (c) symmetrically stepped, or (d) asymmetrically stepped.

12. The actuator as recited in claim 1, wherein the rotor has a movement range of 90 degrees or less extending between an aligned position and an unaligned position.

13. The actuator as recited in claim 12, wherein the rotor is configured to move to the aligned position upon application of an actuation current to the coil, wherein the rotor is configured to move to the unaligned position when the actuation current is removed from the coil.

14. The actuator as recited in claim 1, wherein at least one internal void or inclusion is chevron-shaped.

15. A flight control arrangement, comprising:
a flight control device having first and second positions; and
an actuator as recited in claim 1 operably connected to the flight control device,
wherein the rotor of the actuator has an aligned position and an unaligned position, wherein the flight control device moves between the first position and the second position when the rotor moves between the unaligned and aligned position.

16. The flight control arrangement as recited claim 15, wherein the unaligned position and aligned position are separated by 90 degrees or less.

17. A method of actuating a device, comprising:
applying current to coil;
generating a magnetic flux using the current flow through the coil; and
aligning a rotor supported for rotation with the magnetic flux according to different reluctances arranged along direct and quadrature axes of the rotor, wherein the rotor has at least one internal void and at least one internal inclusion, including a non-ferromagnetic material, that makes reluctance along one of the direct and quadrature axes different than that along the other of the direct and quadrature axes.

18. The method as recited in claim 17, further comprising:
removing current from the coil; and
returning the rotor to an unaligned position using a biasing force exerted against the rotor in opposition to force exerted on the rotor by the magnetic flux.

* * * * *